(12) United States Patent
Arsenault et al.

(10) Patent No.: US 9,132,824 B2
(45) Date of Patent: Sep. 15, 2015

(54) FUEL SAVING SYSTEM THAT FACILITATES VEHICLE RE-STARTS WITH THE ENGINE OFF

(71) Applicant: Développement Effenco Inc., Montréal (CA)

(72) Inventors: David Arsenault, Montréal (CA); Benoit Lacroix, Montréal (CA); Dany Fouquet, Montréal (CA)

(73) Assignee: Développement Effenco Inc., Montréal, Québec (CA)

( * ) Notice: Subject to any disclaimer, the term of this patent is extended or adjusted under 35 U.S.C. 154(b) by 0 days.

(21) Appl. No.: 14/452,301

(22) Filed: Aug. 5, 2014

(65) Prior Publication Data

US 2014/0350807 A1    Nov. 27, 2014

Related U.S. Application Data

(62) Division of application No. 13/739,516, filed on Jan. 11, 2013, now Pat. No. 8,840,524.

(60) Provisional application No. 61/585,422, filed on Jan. 11, 2012.

(51) Int. Cl.
*G06F 17/00* (2006.01)
*B60W 10/06* (2006.01)
(Continued)

(52) U.S. Cl.
CPC .................. *B60W 10/06* (2013.01); *B60K 6/12* (2013.01); *B60K 6/48* (2013.01); *B60W 10/10* (2013.01);
(Continued)

(58) Field of Classification Search
None
See application file for complete search history.

(56) References Cited

U.S. PATENT DOCUMENTS

| 4,354,400 A | 10/1982 | Baker |
| 4,778,020 A | 10/1988 | Hagin et al. |

(Continued)

FOREIGN PATENT DOCUMENTS

| CA | 2582061 | 5/2008 |
| CN | 1835378 | 9/2006 |

(Continued)

OTHER PUBLICATIONS

English Translation of Abstract of CN1835378.
(Continued)

*Primary Examiner* — Dirk Wright
(74) *Attorney, Agent, or Firm* — Bereskin & Parr LLP

(57) ABSTRACT

A fuel saving system for a vehicle powered by an internal combustion engine and having a hydraulically activated automatic transmission. The system includes a hydraulic pump able to supply pressurized transmission fluid to the automatic transmission, an energy storage device, and at least one motor powered by the energy storage device including a motor that is mechanically connected to the hydraulic pump and a motor that is coupled to the engine. The system also includes a controller that is responsive to one or more operating conditions to turn off the engine when the vehicle is stopped and to use the motor that is mechanically connected to the hydraulic pump so as to activate the pump to supply sufficient power to the transmission to maintain engagement of the transmission in a driving gear. The controller is also responsive to one or more operating conditions to activate the motor that is coupled to the engine so as to restart the engine with the transmission engaged in a driving gear.

20 Claims, 11 Drawing Sheets

(51) Int. Cl.
  *B60W 10/11* (2012.01)
  *B60K 6/12* (2006.01)
  *B60K 6/48* (2007.10)
  *B60W 20/00* (2006.01)
  *B60W 10/10* (2012.01)
  *B60W 10/24* (2006.01)

(52) U.S. Cl.
  CPC ............... *B60W 10/11* (2013.01); *B60W 10/24* (2013.01); *B60W 20/10* (2013.01); *B60K 2006/126* (2013.01); *Y02T 10/6208* (2013.01); *Y02T 10/6221* (2013.01); *Y02T 10/6282* (2013.01); *Y10T 477/23* (2015.01); *Y10T 477/26* (2015.01); *Y10T 477/675* (2015.01)

(56) References Cited

U.S. PATENT DOCUMENTS

| | | |
|---|---|---|
| 4,959,962 A | 10/1990 | Hagin et al. |
| 5,839,889 A | 11/1998 | Folsom et al. |
| 5,845,756 A | 12/1998 | Dairokuno et al. |
| 6,170,587 B1 | 1/2001 | Bullock |
| 6,390,947 B1 | 5/2002 | Aoki et al. |
| 6,463,375 B2 | 10/2002 | Matsubara et al. |
| 6,482,127 B2 | 11/2002 | Katou |
| 6,556,910 B2 | 4/2003 | Suzuki et al. |
| 6,709,362 B2 | 3/2004 | Tomohiro et al. |
| 6,799,109 B2 | 9/2004 | Nakamori et al. |
| 6,878,094 B2 | 4/2005 | Kitamura et al. |
| 6,913,558 B2 | 7/2005 | Mori et al. |
| 7,056,260 B2 | 6/2006 | Nakamori et al. |
| 7,150,333 B2 | 12/2006 | Noda et al. |
| 7,314,425 B2 | 1/2008 | Ito et al. |
| 7,351,182 B2 | 4/2008 | Kobayashi |
| 7,465,250 B2 | 12/2008 | Tamai et al. |
| 7,566,288 B2 | 7/2009 | Tabata et al. |
| 7,568,990 B2 | 8/2009 | Sah et al. |
| 7,597,172 B1 | 10/2009 | Kovach et al. |
| 7,669,414 B2 | 3/2010 | Loeffler |
| 7,766,107 B2 | 8/2010 | Joe et al. |
| 7,806,800 B2 | 10/2010 | Ebner et al. |
| 7,848,858 B2 | 12/2010 | Tabata et al. |
| 7,900,724 B2 | 3/2011 | Promersberger et al. |
| 7,913,791 B2 | 3/2011 | Rose et al. |
| 7,951,043 B2 | 5/2011 | Reisch et al. |
| 7,970,505 B2 | 6/2011 | Suzuki |
| 8,062,171 B2 | 11/2011 | Soliman |
| 8,070,648 B2 | 12/2011 | Soliman et al. |
| 8,108,115 B2 | 1/2012 | Kobayashi et al. |
| 8,155,848 B2 | 4/2012 | Kobayashi et al. |
| 8,157,705 B2 * | 4/2012 | Yu et al. ............... 477/200 |
| 8,187,145 B2 | 5/2012 | Kaminsky et al. |
| 8,187,147 B2 | 5/2012 | Tryon et al. |
| 8,192,324 B2 | 6/2012 | Kraska et al. |
| 8,192,328 B2 | 6/2012 | Nedorezov et al. |
| 8,241,176 B2 | 8/2012 | Soliman et al. |
| 8,303,463 B2 | 11/2012 | Sah et al. |
| 8,328,682 B2 | 12/2012 | Christman et al. |
| 8,328,687 B2 | 12/2012 | Gibson et al. |
| 8,403,646 B2 | 3/2013 | Yoshinami |
| 8,414,456 B2 | 4/2013 | Nedorezov et al. |
| 8,430,789 B2 | 4/2013 | Hase et al. |
| 8,494,730 B2 | 7/2013 | Yoshikawa |
| 8,498,790 B2 | 7/2013 | Fujiwara et al. |
| 8,545,367 B2 | 10/2013 | Hartz et al. |
| 8,572,956 B2 | 11/2013 | Miyabe et al. |
| 8,574,123 B2 | 11/2013 | Nedorezov et al. |
| 8,639,424 B2 | 1/2014 | Lundberg et al. |
| 8,678,977 B2 * | 3/2014 | Hase et al. ............ 477/115 |
| 8,744,653 B2 * | 6/2014 | Hase et al. ............. 701/22 |
| 8,840,524 B2 * | 9/2014 | Arsenault et al. ............ 477/5 |
| 2003/0109970 A1 | 6/2003 | Nakamori et al. |
| 2006/0000208 A1 | 1/2006 | Teslak et al. |
| 2006/0021456 A1 | 2/2006 | Hughes |
| 2006/0108860 A1 | 5/2006 | Stragier |
| 2006/0116797 A1 | 6/2006 | Moran |
| 2006/0184304 A1 | 8/2006 | Katou et al. |
| 2006/0196710 A2 | 9/2006 | Banginski et al. |
| 2007/0182245 A1 | 8/2007 | DuCharme |
| 2007/0227801 A1 | 10/2007 | Loeffler |
| 2008/0032842 A1 | 2/2008 | Johnson et al. |
| 2008/0042489 A1 | 2/2008 | Lewis et al. |
| 2008/0174174 A1 | 7/2008 | Burns et al. |
| 2009/0127011 A1 | 5/2009 | Zhang |
| 2010/0004089 A1 | 1/2010 | Iwase et al. |
| 2010/0174429 A1 | 7/2010 | Hase et al. |
| 2010/0186408 A1 | 7/2010 | Rose et al. |
| 2010/0305790 A1 | 12/2010 | Yu et al. |
| 2011/0071001 A1 | 3/2011 | Yu et al. |
| 2011/0319227 A1 | 12/2011 | Kamada et al. |

FOREIGN PATENT DOCUMENTS

| | | |
|---|---|---|
| CN | 101332774 | 12/2008 |
| DE | 2551580 | 5/1977 |
| DE | 4224075 | 2/1994 |
| EP | 0047643 | 3/1982 |
| EP | 0094664 | 11/1983 |
| EP | 0140046 | 5/1985 |
| EP | 0248178 | 12/1987 |
| EP | 2613016 | 9/1988 |
| EP | 0650419 | 5/1995 |
| EP | 1279868 | 1/2003 |
| EP | 1344674 | 9/2003 |
| EP | 1733910 | 12/2006 |
| EP | 1935697 | 6/2008 |
| EP | 2233646 | 9/2010 |
| EP | 2287488 | 2/2011 |
| JP | 2-117438 | 5/1990 |
| JP | 06-286499 | 10/1994 |
| JP | 11-210485 | 8/1999 |
| JP | 2003-083302 | 3/2003 |
| WO | 2006038968 | 4/2006 |
| WO | 2006066156 | 6/2006 |
| WO | 2006079179 | 8/2006 |
| WO | 2009001001 | 12/2008 |
| WO | 2010087893 | 8/2010 |

OTHER PUBLICATIONS

English Translation of Abstract of CN101332774.
English Translation of Abstract of DE2551580.
English Translation of Abstract of DE4224075.
English Translation of Abstract of EP0094664.
English Translation of Abstract of EP0140046.
English Translation of Abstract of EP0248178.
English Translation of Abstract of EP0650419.
English Translation of Abstract of EP1935697.
English Translation of Abstract of EP2233646.
English Translation of Abstract of FR2613016.
English Translation of Abstract of JP2-117438.
English Translation of Abstract of JP06-286499.
English Translation of Abstract of JP11-210485.
English Translation of Abstract of JP2003-083302.
International Search Report of Corresponding PCT Application No. PCT/CA2013/000025.

* cited by examiner

FUEL SAVING SYSTEM THAT FACILITATES VEHICLE RE-STARTS WITH THE ENGINE OFF

TECHNICAL FIELD

The present subject matter relates to vehicles powered by an internal combustion engine, and more particularly to systems for improving fuel economy on such vehicles.

BACKGROUND

Most vehicles powered by an internal combustion engine waste a considerable amount of fuel during periods when the vehicle is stopped and the engine is idling. For vehicles like refuse trucks, the idling engine is frequently used to drive auxiliary hydraulic systems when the vehicle is stopped, namely the hydraulic arm that picks up curb-side trash bins, and the hydraulic compactor that compresses the trash in the truck. However, the power required to perform this work is relatively low and a significant portion of the fuel consumed while the engine is idling is mainly used to overcome internal friction in the engine, which results in a very low fuel efficiency during the typical duty cycle of a refuse truck.

Even though the auxiliary hydraulic system may not be required for each stop, or the auxiliary hydraulic system could be powered independently of the engine, it would not be an acceptable option to turn off the engine of a typical OEM refuse truck each time the truck was stopped at a collection point. For one thing, the starting motor of such trucks would undoubtedly suffer premature wear if used to restart the engine as many as one thousand times per day or more, which is the normal duty cycle for a refuse truck.

Moreover, many refuse trucks are equipped with an automatic transmission having a hydraulic shifting mechanism. The hydraulic pressure in the transmission is supplied by a pump that is integrated within the transmission but driven by the internal combustion engine. When the internal combustion engine is turned off, the transmission pump stops supplying pressure to the transmission and as a result, the transmission automatically shifts from drive into neutral. When the internal combustion engine is restarted, a period of time is needed to rebuild hydraulic pressure in the transmission, which delays the ability to shift the transmission into drive. Such a delay would be frustrating to the operator of the truck; the delay could also be potentially dangerous as there would be a risk that the truck could roll back if it were stopped on an upward slope.

The power steering system of typical vehicles also does not work when the engine is turned off as the power steering fluid pump is as well driven by the internal combustion engine.

SUMMARY

The following summary is intended to introduce the reader to the more detailed description that follows, and not to define or limit the claimed subject matter.

The claimed subject matter provides the advantages of presenting a relatively simple architecture making it both easily retrofitted to existing vehicles such as refuse trucks, or installed on new vehicles as original equipment.

According to one aspect of the present disclosure, a fuel saving system is provided for a vehicle powered by an internal combustion engine and having a hydraulically activated automatic transmission. The system includes a hydraulic pump able to supply pressurized transmission fluid to the automatic transmission, an energy storage device, and at least one motor powered by the energy storage device including a motor that is mechanically connected to the hydraulic pump and a motor that is coupled to the engine. The system also includes a controller that is responsive to one or more operating conditions to turn off the engine when the vehicle is stopped and to use the motor that is mechanically connected to the hydraulic pump so as to activate the pump to supply sufficient power to the transmission to maintain engagement of the transmission in a driving gear. The controller is also responsive to one or more operating conditions to activate the motor that is coupled to the engine so as to re-start the engine with the transmission engaged in a driving gear.

In some examples, the system has a single motor that is mechanically connected to the hydraulic pump able to supply pressurized transmission fluid to the automatic transmission and also disengageably coupled to the engine.

In other examples, the system has a first motor that is coupled to the engine, and a second motor that is mechanically connected to the hydraulic pump able to supply pressurized transmission fluid to the automatic transmission and to the pump for the auxiliary hydraulic system.

In some examples, the energy storage device is an electric energy storage device such as a battery or a capacitor; the at least one motor may be an electric motor/generator powered by the electric storage device. In other examples, the energy storage device is a hydraulic accumulator and the at least one motor is a hydraulic motor powered by the hydraulic accumulator; the hydraulic accumulator may be charged by a braking energy recovery system.

In certain embodiments, where the system is used on a vehicle that includes an auxiliary hydraulic system, a pump powered by the at least one motor supplies pressurized hydraulic fluid to the auxiliary hydraulic system when the engine is off and the at least one motor is on.

In some embodiments, where the vehicle includes one or more accessory systems, the energy storage device provides power to the accessory systems when the engine is off.

BRIEF DESCRIPTION OF DRAWINGS

In order that the claimed subject matter may be more fully understood, reference will be made to the accompanying drawings, in which:

DESCRIPTION OF VARIOUS EMBODIMENTS

In the following description, specific details are set out to provide examples of the claimed subject matter. However, the embodiments described below are not intended to define or limit the claimed subject matter. It will be apparent to those skilled in the art that many variations of the specific embodiments may be possible within the scope of the claimed subject matter.

Figure 1:
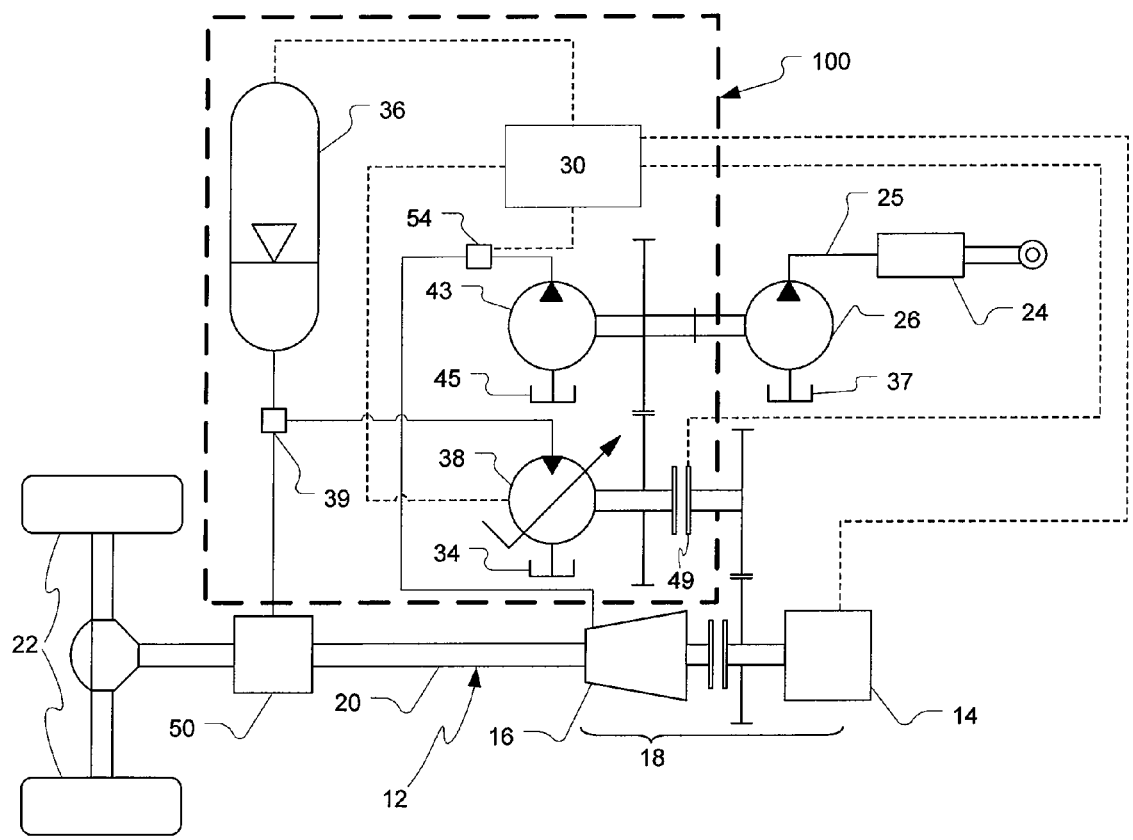
FIG. 1 is a schematic view of a fuel saving system in accordance with a first embodiment of the present subject matter.

A first embodiment is shown in FIG. 1 which schematically depicts a fuel saving system 100 installed on a powertrain 12 of a vehicle. The components of the powertrain 12 are an internal combustion engine 14 and a transmission 16, together forming an engine-transmission assembly 18, and a driveshaft 20 connecting a wheel set 22 to the transmission 16. The powertrain 12 is equipped with a braking energy recovery system 50. An auxiliary hydraulic system 24 is connected through a hydraulic connection line 25 to an auxiliary hydraulic pump 26, which can either be driven by the internal combustion engine 14 or by a variable displacement hydraulic motor 38. An auxiliary system 24 is often provided on vehicles such as refuse trucks or cement truck, to which the fuel saving system may be installed. Such auxiliary system 24 may be any hydraulically powered piece of equipment, such as garbage compactor, hydraulic arm to lift a garbage can, rotary cement mixer or other hydraulically powered equipment.

The fuel saving system 100 uses a clutch 49 that is adapted to selectively engage or disengage the variable displacement hydraulic motor 38, the auxiliary hydraulic pump 26 and a fixed displacement hydraulic pump 43 to the internal combustion engine 14. A controller 30 controls the engagement of the clutch 49. The controller 30 may be an electric, electronic, hydraulic or pneumatic circuit.

The variable displacement hydraulic motor 38 is hydraulically connected to an energy storage device, which according to the first embodiment is a hydraulic accumulator 36. The hydraulic flow between both is regulated by the valve 39. The accumulator 36 is used to store the hydraulic fluid under pressure. The pressure is created inside the accumulator 36 by a pressurized gas on an opposed side of a piston or membrane from the hydraulic fluid. The variable displacement hydraulic motor 38 is operative to use, through pressurized hydraulic fluid, the energy received from the accumulator 36 and transform it into a rotational movement. Hence, the variable displacement hydraulic motor 38 is adapted to be mechanically connected to drive a mechanical device by this rotational movement, using the energy stored in the hydraulic accumulator 36 in the form of pressurized hydraulic fluid.

The energy stored in the accumulator 36 is provided by the braking energy recovery system 50. In the braking energy recovery system 50, there is a variable displacement pump which is driven by the wheel set 22, a resistance is created when the controller increases the displacement of the variable displacement pump. This opposes the rolling movement of the wheel set 22, thereby assisting its braking. The larger the flow rate of hydraulic fluid pumped by the variable displacement pump, the larger the assistance to the braking of the wheel set 22.

The controller 30 matches the braking demand by carefully combining the braking effort from a foundation braking system of the vehicle with the braking assistance provided by the braking energy recovery system as it stores energy. Advantageously, the variable displacement pump is sized according to the maximum braking torque it has to apply on the wheel set. The controller 30 may then modulate the displacement of the variable displacement pump so as to maximize the level of braking assistance to the braking system, without neither exceeding the braking demand nor the capacity of the hydraulic accumulator 36. The controller 30 takes into account the capacity of the hydraulic accumulator 36 and may therefore decrease the level of braking assistance in accordance with the storage availability of the hydraulic accumulator 36. The detection of the braking demand may be achieved in many different ways: electrically, electronically, hydraulically or pneumatically, at any convenient location on the braking system.

The fixed displacement hydraulic pump 43 can pump hydraulic fluid from a reservoir 45 to provide hydraulic pressure to the transmission 16. This pump is mechanically engaged to the variable displacement hydraulic motor 38. The hydraulic connection between the fixed displacement hydraulic pump 43 and the transmission 16 is regulated by a valve 54 in order to maintain the appropriate pressure in the transmission 16. The controller 30 modulates the variable displacement hydraulic motor 38 through the valve 39 to meet the pressure requirement of the transmission 16.

The auxiliary hydraulic pump 26 is mechanically connected to the variable displacement hydraulic motor 38. The auxiliary hydraulic pump 26 may pump hydraulic fluid from a reservoir 37 to provide hydraulic pressure to the auxiliary system 24. Both are connected through a hydraulic collection line 25.

Figure 2:
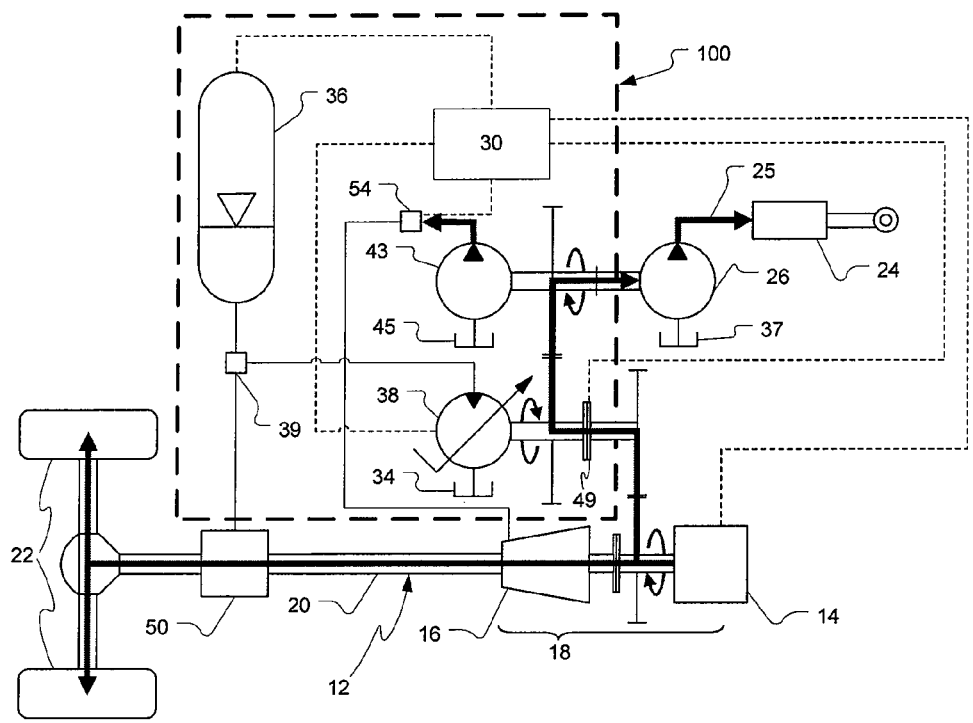
FIG. 2 is a schematic view of a fuel saving system in accordance with a first embodiment of the present subject matter representing the normal mode operation.

The four different operating modes of the fuel saving system will now be explained in more detail. FIG. 2 schematically depicts the normal mode of the fuel saving system 100. When the engine 14 is idling and drives the wheel set 22 through the powertrain 12, the clutch 49 is engaged, and can connect the variable displacement hydraulic motor 38 to the driving portion of the powertrain. In this mode, the variable displacement hydraulic motor 38 provides no torque. Therefore, the auxiliary hydraulic pump 26 is driven by the internal combustion engine 14 in order to feed the auxiliary hydraulic system 24. The fixed displacement hydraulic pump 43 turns but the generated oil flow is vented to the transmission hydraulic reservoir 45 by valve 54.

Figure 3:
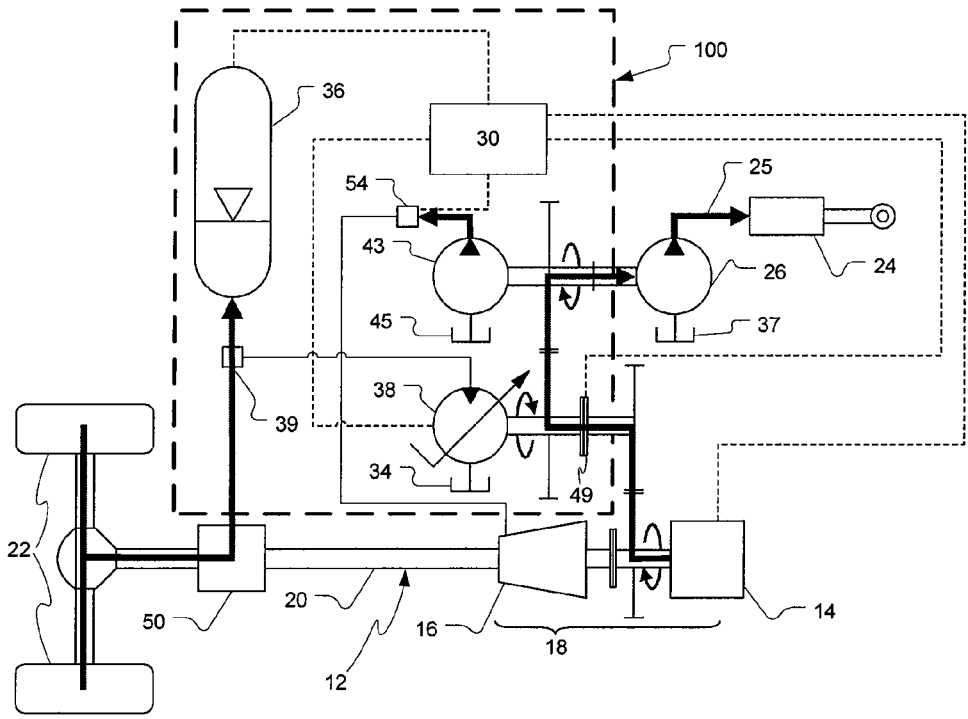
FIG. 3 is a schematic view of a fuel saving system in accordance with a first embodiment of the present subject matter representing the regenerative braking mode operation.

FIG. 3 schematically depicts the regenerative braking mode of the fuel saving system 100. When the vehicle is moving and the driver presses the brake pedal, the braking energy recovery system 50 is activated to generate the required braking torque to the wheel set 22 until the vehicle is stopped. Then, the recovered energy is stored in the hydraulic accumulator 36 in the form of pressurized fluid. The controller 30 opens the valve 39 to connect the hydraulic accumulator 36 with the braking energy recovery system 50 and modulates the quantity of energy that can be stored in the accumulator 36. If the accumulator 36 reaches its maximum capacity, the controller 30 deactivates the energy recovery system 50. In the regenerative braking mode, the clutch 49 is engaged, and connects the variable displacement hydraulic motor 38 to the driving portion of the powertrain. In this mode, the variable displacement hydraulic motor 38 provides no torque. Therefore, the auxiliary hydraulic pump 26 is driven by the internal combustion engine 14, in order to feed the auxiliary hydraulic system 24. The fixed displacement hydraulic pump 43 turns but the generated oil flow is vented to the transmission hydraulic reservoir 45 by valve 54.

Figure 4:
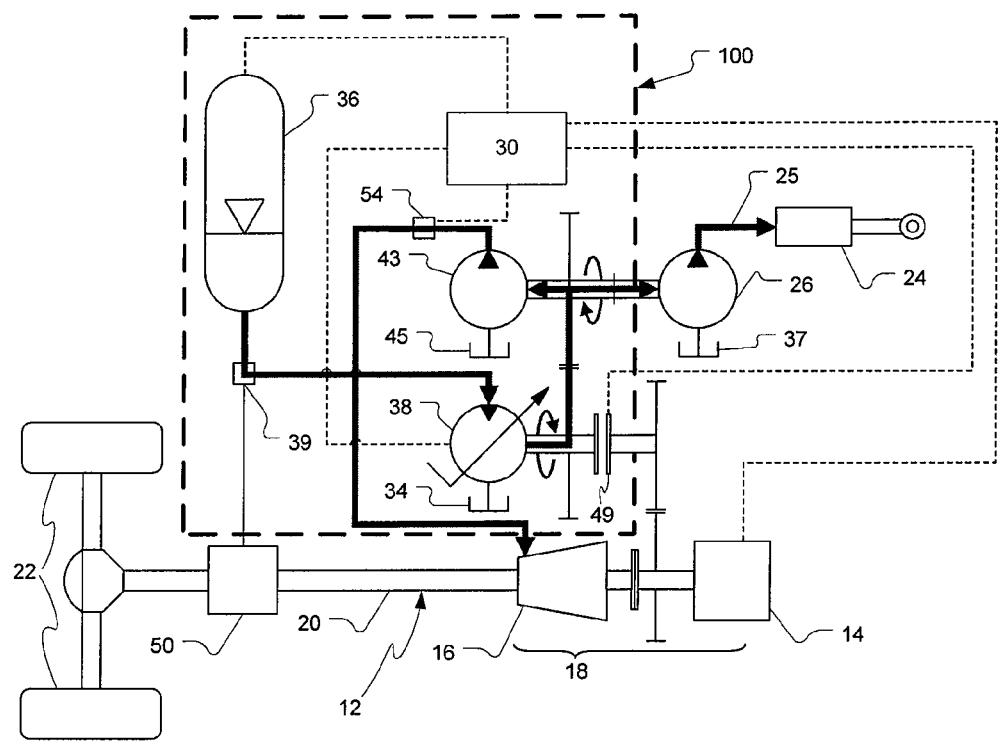
FIG. 4 is a schematic view of a fuel saving system in accordance with a first embodiment of the present subject matter representing the engine shutdown mode operation.

FIG. 4 schematically depicts the engine shutdown mode of the fuel saving system 100. When the vehicle is stopped, the internal combustion engine 14 is turned off. The controller 30 detects an operating condition associated with the engine shutdown mode. For example, the operating condition may be the speed of the vehicle indicating that the vehicle has slowed down or stopped. Other operating conditions may also be detected, such as the amount of energy remaining in the hydraulic accumulator 36. The controller 30 responds to the detected operating condition by communicating with the electronic controlling unit of the engine 14 to send the instruction to shut down the engine 14. The internal combustion engine 14 may be turned off completely only when the power demand from the auxiliary system can be met entirely by the variable displacement hydraulic motor 38, that is to say, if the controller 30 evaluates that there is enough energy stored in the hydraulic accumulator 36. The clutch 49 is disengaged from the driving portion of the powertrain 12 when the internal combustion engine 14 is turned off. The variable displacement hydraulic motor 38, which drives the auxiliary hydraulic pump 26, is now driven by the energy contained in the hydraulic accumulator 36. Then, during the time when the internal combustion engine 14 is turned off, the variable displacement hydraulic motor 38 is modulated to maintain the required hydraulic power to the auxiliary hydraulic system 24.

One problem caused by turning off and then restarting the internal combustion engine 14 is that when the internal combustion engine is turned off, no power from the engine 14 is provided to the transmission 16. Consequently, if the transmission 16 is of the automatic type, there will be a lack of hydraulic pressure and the transmission cannot be maintained in a driving gear (for example first gear). Instead the transmission will fall into a "neutral gear". After restarting the internal combustion engine, the hydraulic pressure in the transmission would have to be built up before there would be sufficient energy for the transmission to change from neutral to a driving gear. The time required for the hydraulic pressure to build up and shift to the driving gear is typically several seconds. Consequently an operator of the vehicle will feel a lag between restarting the vehicle and when the vehicle actually starts accelerating after its transmission has selected a driving gear. In a typical operation where the operator starts the vehicle using an electrical ignition system while the vehicle is completely stationary, this lag is acceptable. However, in a situation where the operator is used to the internal combustion engine 14 idling when the vehicle is stopped, and further expects the vehicle to immediately accelerate following the operator's command (for example stepping on the gas pedal), this lag may be frustrating or even dangerous. For example, in a situation where the vehicle is on an uphill incline, having a lag between the time when an operator gives a command to accelerate and the actual time the vehicle starts accelerating can cause the vehicle to roll backwards down the incline for several seconds before being able to stop and accelerate forward.

To prevent the transmission 16 from falling out of a driving gear into a neutral gear with the present system 100, hydraulic pressure is provided by the fixed displacement hydraulic pump 43 through a hydraulic circuit to the transmission 16 when the engine 14 is turned off. The fixed displacement hydraulic pump 43 is powered by the variable displacement hydraulic motor 38 and provides pressure to the transmission 16 to maintain it in a driving gear. After starting the internal combustion engine 14 using the variable displacement hydraulic motor 38, the transmission 16 will thus still be in a driving gear and no lag will be felt by the vehicle operator when a command to accelerate the vehicle is given. It will be appreciated that the level of power needed to maintain the transmission in gear is substantially lower than the power needed to idle the internal combustion engine 14 for even a short period of time. Therefore turning off the internal combustion engine 14 and using the hydraulic energy stored in the hydraulic accumulator 36 to engage the fixed displacement hydraulic pump 43 to maintain the transmission in a driving gear provides a significant saving in fuel consumption.

Figure 5:
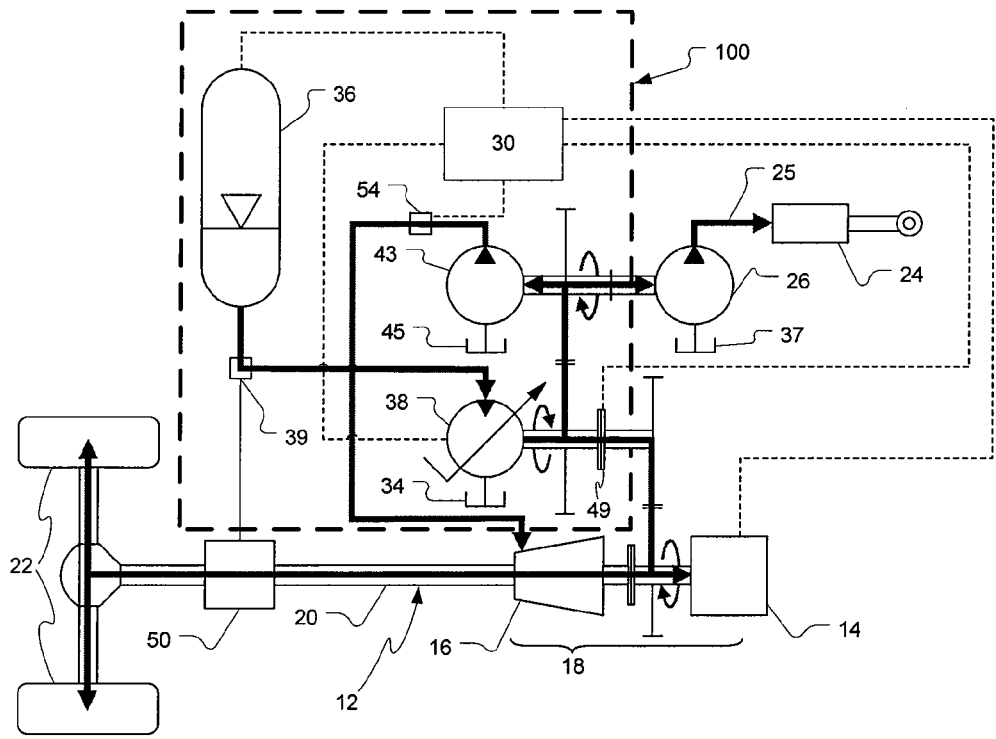
FIG. 5 is a schematic view of a fuel saving system in accordance with a first embodiment of the present subject matter representing the restarting mode operation.

FIG. 5 schematically depicts the restarting mode of the fuel saving system 100. A consequence of turning off the internal combustion engine 14 is that when an operator needs to resume motion of the vehicle on which the fuel saving system is installed, the internal combustion engine 14 must be restarted. Typically in a vehicle having an internal combustion engine, the engine is started using an electrical ignition system. In situations where a vehicle will often start and stop, frequent restarting of the internal combustion engine is required. It will be appreciated that such frequent restarting would rapidly drain the battery containing the electrical energy powering the electrical ignition system. This problem would be especially prevalent when the internal combustion engine is no longer idling to recharge the battery.

The solution of the present system 100 is to have the variable displacement hydraulic motor 38, which is mechanically connected to the powertrain of the engine 14, drive the engine in order to restart it. The controller 30 detects an operating condition associated with the restarting mode. The operating condition may be a signal from the vehicle operator, such as, the position of the accelerator pedal, wherein the accelerator pedal being stepped on by the operator indicates that the engine 14 should be restarted. Other operating conditions may be detected, for example a low amount of energy remaining in the hydraulic accumulator 39. The controller 30 responds to the detected operating condition by causing clutch 49 to engage the variable displacement hydraulic motor 38 with the internal combustion engine 14. Torque provided by the variable displacement hydraulic motor 38 to the engine 14 causes the engine to "restart". The internal combustion engine 14 is considered to be "restarted" when it has reached its idling speed.

Furthermore, if the controller 30 determines that the level of energy stored in the hydraulic accumulator 36 is sufficient, the controller 30 may be programmed to assist the internal combustion engine 14 by driving it with the variable displacement hydraulic motor 38. Whether the internal combustion engine 14 is accelerating, at a steady speed, or turning idle at the time of this assistance from variable displacement hydraulic motor 38, the result is a decrease in fuel consumption.

Furthermore, to avoid having accessory systems (systems in the vehicle other than the auxiliary hydraulic system 24 or the drivetrain 12) such as power steering, alternator, or air conditioning, to not work when the engine is turned off, it is possible to power these accessory systems using energy stored in the energy storage device. It is possible to mechanically connect these accessory systems to the variable displacement hydraulic motor 38 in the same manner as for the auxiliary hydraulic pump 26 and the fixed displacement hydraulic pump 43. Then, if the engine 14 is not running and is just about to restart, the variable displacement hydraulic motor 38, powered by the accumulator 36, will drive these accessory systems.

For all the modes of operation previously described, the fixed displacement hydraulic pump 43 and the auxiliary pump 26 are constantly powered. The controller 30 further monitors if the clutch 49 has to be engaged or not. If the engine 14 is running, the clutch 49 will be engaged by the controller 30; the fixed displacement hydraulic pump 43 and the auxiliary pump 26 will be powered by the engine 14. If the engine 14 is not running, the clutch 49 will be disengaged by the controller 30; the fixed displacement hydraulic pump 43 and the auxiliary pump 26 will be powered by the variable displacement hydraulic motor 38. If the controller 30 receives the signal to re-launch the vehicle, the clutch 49 will be engaged and the engine 14 will be restarted by the variable displacement hydraulic motor 38.

Figure 6:
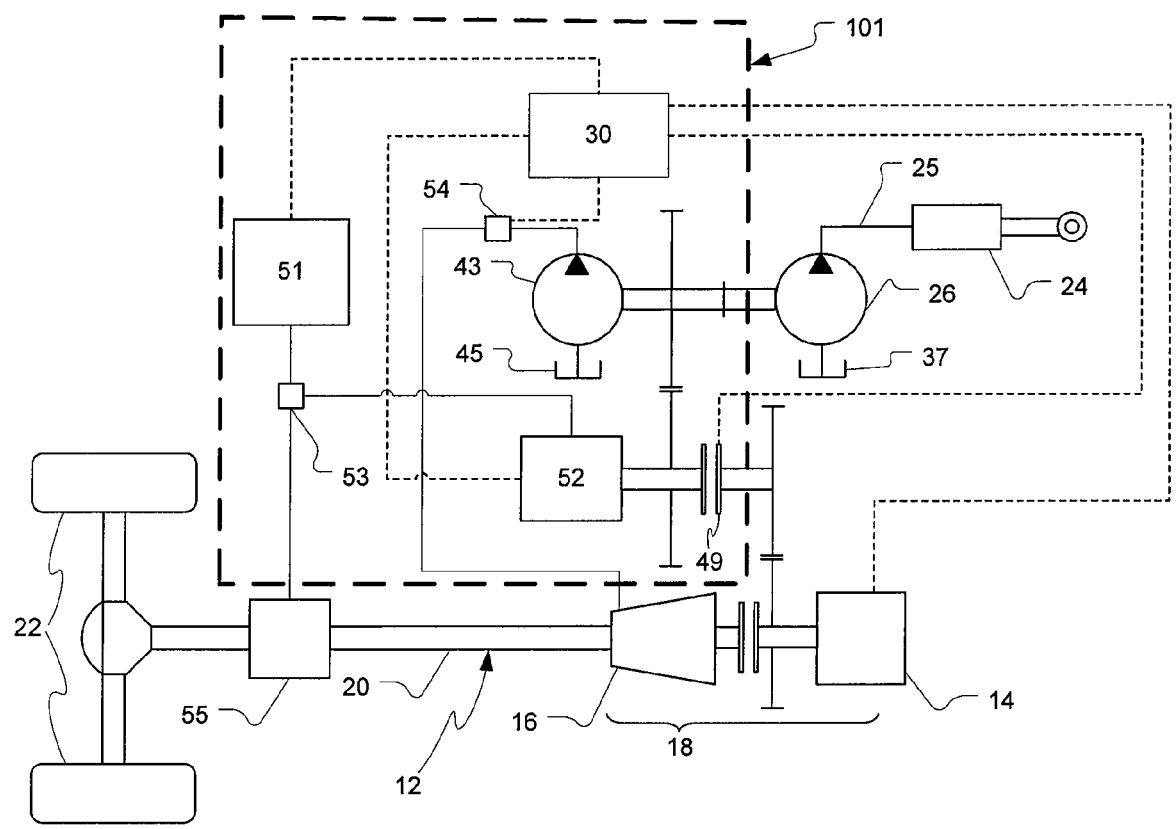
FIG. 6 is a schematic view of a fuel saving system in accordance with a second embodiment of the present subject matter.

Turning to FIG. 6, it will be seen that the second embodiment of the fuel saving system 101 is similar to the first embodiment already described except that the variable displacement hydraulic motor 38 is replaced with an electrical motor-generator 52 and the energy storage device is an electrical storage device 51 instead of a hydraulic accumulator. The electrical storage device 51 can be charged by an external source of electrical power through an electrical connection and/or by an electrical braking energy recovery system 55. The electrical storage device 51 can be a battery pack as well as a super-capacitor.

The electrical storage device 51 can provide its stored energy through an electrical connection to the electrical motor-generator 52. An electrical drive 53 manages the energy flow between the electrical storage device 51 and the motor-generator 52. The same operating modes as for the first embodiment apply for the second embodiment.

Figure 7:
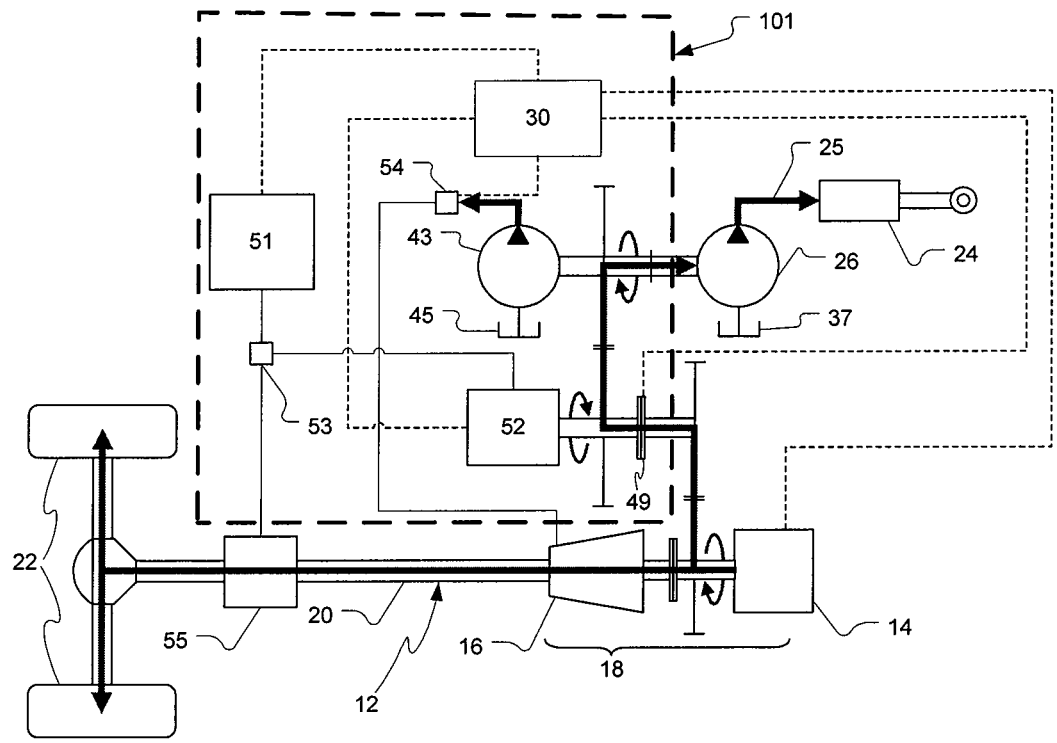
FIG. 7 is a schematic view of a fuel saving system in accordance with a second embodiment of the present subject matter representing the normal mode operation.

FIG. 7 schematically depicts the normal mode of operation, similar to the one described in respect of FIG. 2 for the first embodiment, but the variable displacement hydraulic motor 38 is replaced by the motor-generator 52 and the hydraulic accumulator 36 is replaced by an electrical storage device 51.

Figure 8:
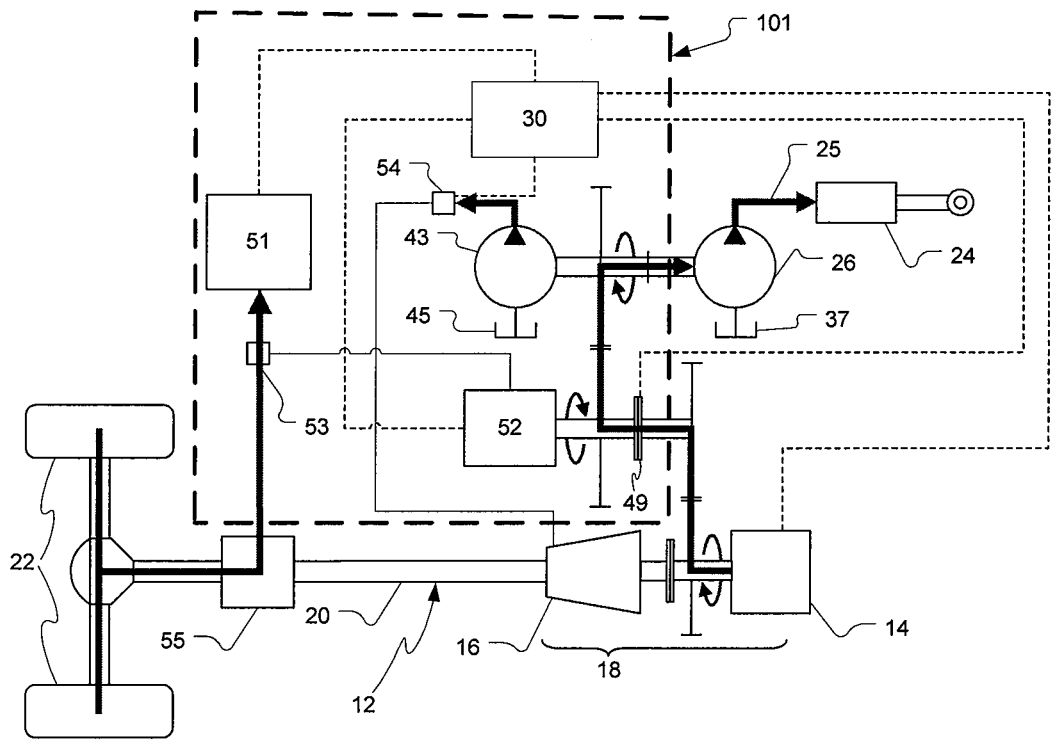
FIG. 8 is a schematic view of a fuel saving system in accordance with a second embodiment of the present subject matter representing the regenerative braking mode operation.

FIG. 8 schematically depicts the regenerative braking mode, similar in operation to the one shown in FIG. 3 for the first embodiment, but the variable displacement hydraulic motor 38 is replaced by a motor-generator 52 and the hydraulic accumulator 36 is replaced by an electrical storage device 51.

Figure 9:
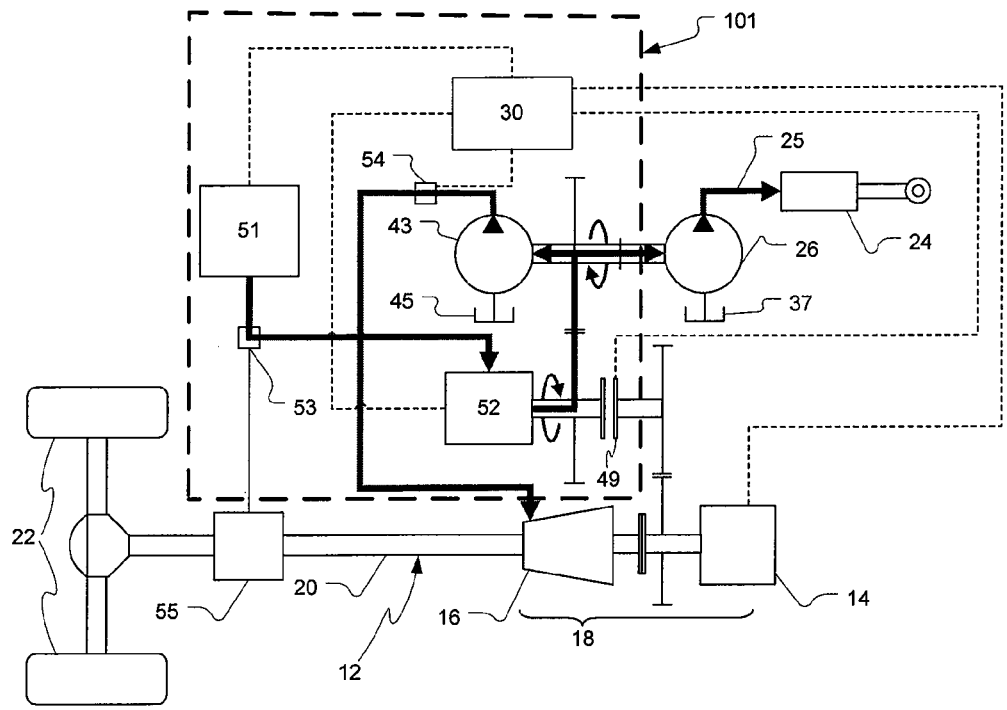
FIG. 9 is a schematic view of a fuel saving system in accordance with a second embodiment of the present subject matter representing the shutdown mode operation.

FIG. 9 schematically depicts the engine shutdown mode of operation, similar to what is described, in respect of FIG. 4 for the first embodiment, but the variable displacement hydraulic motor 38 is replaced by a motor-generator 52 and the hydraulic accumulator 36 is replaced by an electrical storage device 51.

Figure 10:
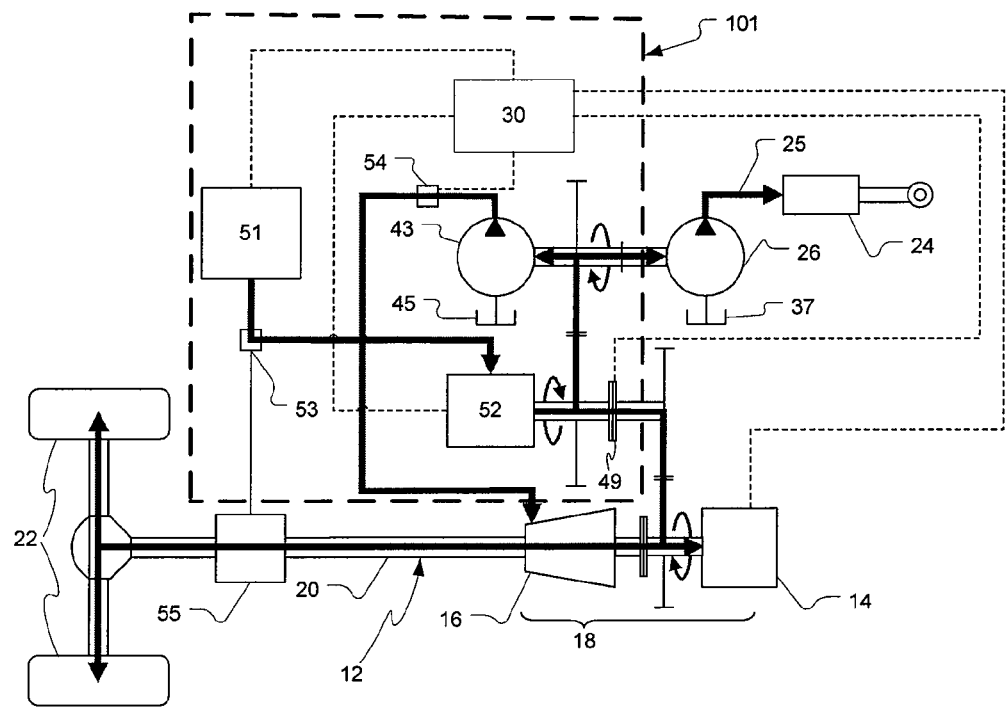
FIG. 10 is a schematic view of a fuel saving system in accordance with a second embodiment of the present subject matter representing the restarting mode operation.

FIG. 10 schematically depicts the engine restarting mode similar to what is described in FIG. 5 for the first embodiment but the variable displacement hydraulic motor 38 is now replaced by a motor-generator 52 and the hydraulic accumulator 36 is now replaced by an electrical storage device 51.

Furthermore, to avoid having accessory systems (systems in the vehicle other than the auxiliary hydraulic system 24 or the drivetrain 12) such as power steering, alternator, or air conditioning, to not work when the engine is turned off, it is possible to power these accessory systems using energy stored in the energy storage device. It is possible to mechanically connect these accessory systems to the motor-generator 52. Then, if the engine 14 is not running and is just about to restart, the motor-generator 52, powered by the electric storage device 51, will drive these accessory systems.

Figure 11:
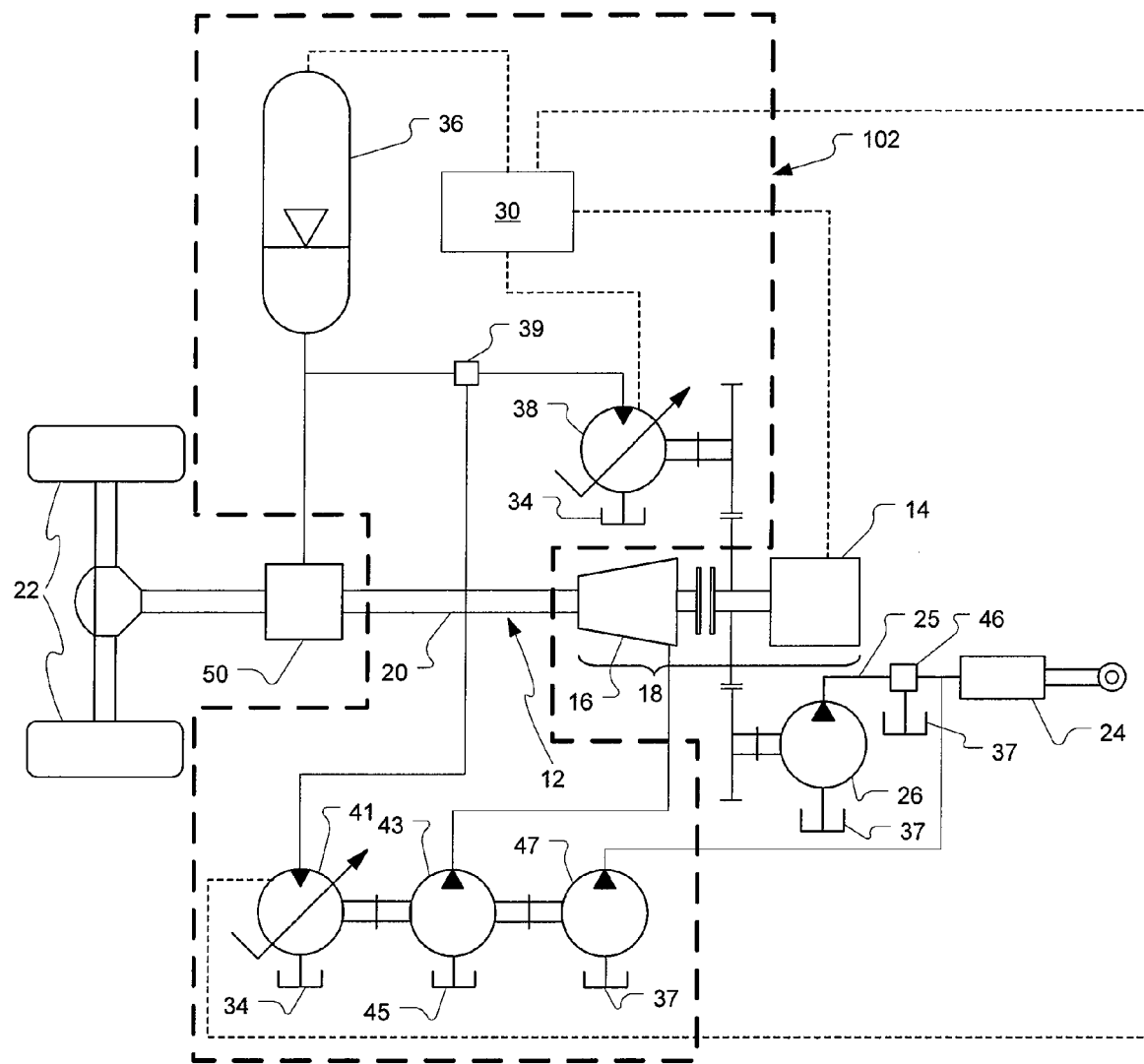
FIG. 11 is a schematic view of a fuel saving system in accordance with a third embodiment of the present subject matter.

FIG. 11 schematically depicts an alternative fuel saving system 102 which is installed on the powertrain 12 of a vehicle. The components of the powertrain 12 shown in FIG. 11 are an internal combustion engine 14 and a transmission 16, together forming an engine-transmission assembly 18, and a driveshaft 20 connecting a wheel set 22 to the transmission 16. The wheel set 22 is equipped with a braking energy recovery system 50. Auxiliary system 24 is connected through a hydraulic connection line 25 to the auxiliary hydraulic pump 26, which can be driven either by the internal combustion engine 14 or by a variable displacement hydraulic motor 38. Since the auxiliary hydraulic pump 26 is always mechanically connected with the internal combustion engine 14, an unloading valve 46 is placed on the hydraulic connection line 25 between the auxiliary hydraulic pump 26 and the auxiliary system 24. This unloading valve 46 is used to divert the hydraulic fluid to the reservoir 37 when the fixed displacement pump 47 is active.

The fuel saving system 102 uses a variable displacement hydraulic motor 38 that is mechanically connected to the auxiliary hydraulic pump 26 and to the internal combustion engine 14. The variable displacement hydraulic motor 38 is also hydraulically connected to the hydraulic accumulator 36. The hydraulic accumulator 36 is used to store hydraulic fluid under pressure. The pressure is created inside the hydraulic accumulator 36 by a pressurized gas on an opposed side of a piston or membrane from the hydraulic fluid. The variable displacement hydraulic motor 38 is operative to use, through the pressurized hydraulic fluid, the energy received from the hydraulic accumulator 36 and transform it into a rotational movement. Hence, the variable displacement hydraulic motor 38 is adapted to be mechanically connected to drive a mechanical device by this rotational movement, using the energy stored in the hydraulic accumulator 36 in the form of pressurized hydraulic fluid. The variable displacement hydraulic motor 38 may be connected to the internal combustion engine 14 through the PTO or directly on the crankshaft or the flywheel of the internal combustion engine 14. The variable displacement hydraulic motor 38 may be connected to the internal combustion engine 14 by a clutch to allow disengaging the motor 38 when not required. Moreover, the auxiliary hydraulic pump 26 may be connected to the PTO, directly on the crankshaft or the flywheel of the internal combustion engine 14, or to any other convenient location. The auxiliary hydraulic pump 26, which may be a fixed or a variable displacement pump, may be directly driven by the variable displacement hydraulic motor 38.

The energy stored in the accumulator 36 is provided by a braking energy recovery system 50. In the braking energy recovery system 50, there is a variable displacement pump which is driven by the wheel set 22, a resistance is created when the controller 30 increases the displacement of the variable displacement pump. This opposes the rolling movement of the wheel set 22, thereby assisting its braking. The larger the flow rate of hydraulic fluid pumped by the variable displacement pump, the larger the assistance to the braking of the wheel set 22.

The controller 30 matches the braking demand by carefully combining the braking effort from the "foundation" braking system of the vehicle with the braking assistance provided by the braking energy recovery system 50 as it stores energy.

Advantageously, the variable displacement pump is sized according to the maximum braking torque it has to apply on the wheel set 22. The controller 30 may then modulate the displacement of the variable displacement pump so as to maximize the level of braking assistance to the braking system, without exceeding either the braking demand or the capacity of the accumulator 36. The controller 30 takes into account the capacity of the accumulator 36 and may therefore decrease the level of braking assistance in accordance with the storage availability of the accumulator 36. The detection of the braking demand may be achieved in many different ways: electrically, electronically, hydraulically or pneumatically, at any convenient location on the braking system.

A second hydraulic variable displacement motor 41 is hydraulically connected to the accumulator 36. The motor 41 is operative to use, through pressurized hydraulic fluid, the energy received from the accumulator 36 and transform it into a rotational movement. This motor 41 is not directly connected in any way to the internal combustion engine 14.

A fixed displacement hydraulic pump 43 is mechanically connected to the second hydraulic variable displacement motor 41. The fixed displacement hydraulic pump 43 can pump hydraulic fluid from a reservoir 45 to provide hydraulic pressure to the transmission 16 of the vehicle through a hydraulic connection. The second motor 41 is adapted to drive the fixed displacement hydraulic pump 43, which in turn provides hydraulic pressure to the transmission 16. A second auxiliary hydraulic pump 47 is also mechanically connected to the second hydraulic variable displacement motor 41. The second auxiliary pump 47 is further hydraulically connected to the auxiliary system 24 through a hydraulic circuit. The second motor 41 is adapted to drive this second auxiliary pump 47, which in turn provides hydraulic pressure to the auxiliary system 24 to power it.

The second motor 41 is sized according to the maximum torque required to drive the fixed displacement hydraulic pump 43 and second auxiliary pump 47 that are respectively powering the transmission 16 and the auxiliary system 24.

Both the first and second auxiliary hydraulic pumps 26 and 47 can pump hydraulic fluid from an auxiliary reservoir 37 to provide hydraulic pressure to the auxiliary system 24.

The fixed displacement hydraulic pump 43 pumps hydraulic fluid from a transmission fluid reservoir 45.

Since both the second auxiliary hydraulic pump 47 and the auxiliary hydraulic pump 26 are connected to the auxiliary system 24, either of them, may provide hydraulic power to the auxiliary system 24.

Figure 12:
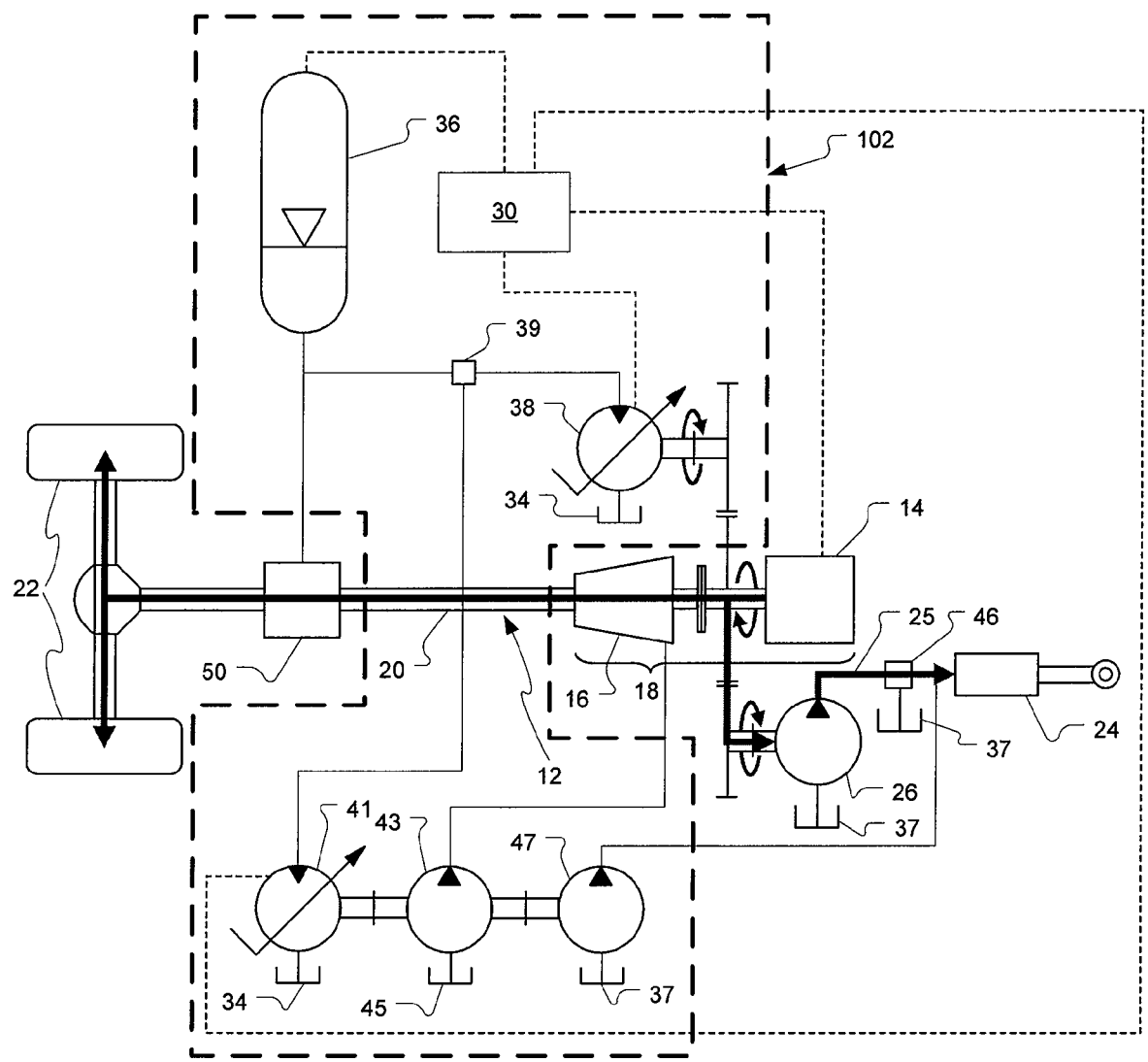
FIG. 12 is a schematic view of a fuel saving system in accordance with a third embodiment of the present subject matter representing the normal mode operation.

FIG. 12 schematically depicts the normal operating mode of the fuel saving system 102. The auxiliary hydraulic pump 26 is driven by the internal combustion engine 14 in order to feed the auxiliary hydraulic system 24. At that point the variable displacement hydraulic motor 41 does not turn and therefore, the two fixed displacement hydraulic pumps 43 and 47 are not turning either.

Figure 13:
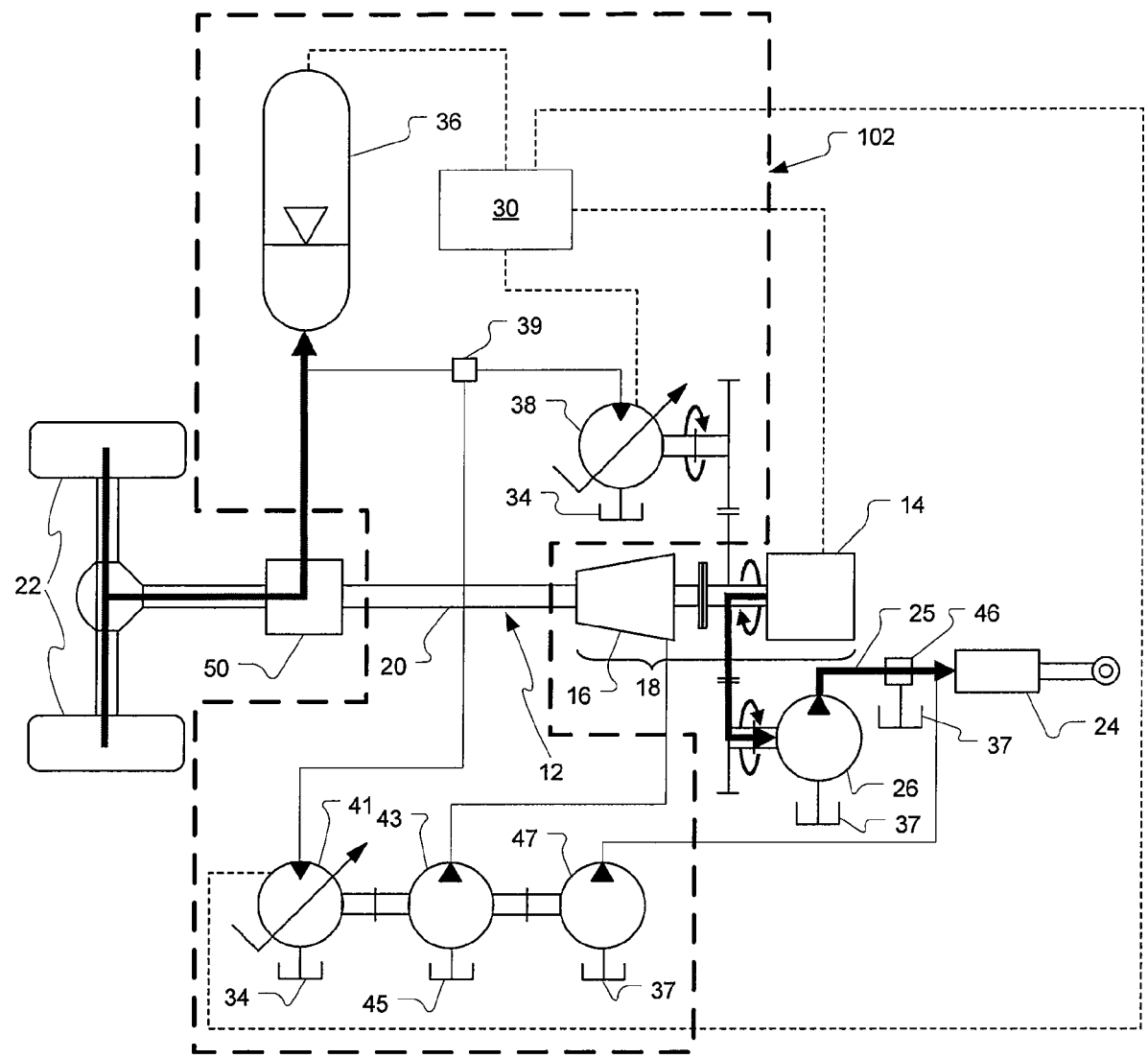
FIG. 13 is a schematic view of a fuel saving system in accordance with a third embodiment of the present subject matter representing the regenerative braking mode operation.

FIG. 13 schematically depicts the regenerative braking mode of the fuel saving system 102. In this mode, when the controller 30 detects that the vehicle is moving and the driver presses the brake pedal, the braking energy recovery system 50 is activated to generate the required braking torque to the wheel set 22 until the vehicle is stopped. The recovered energy is stored in the hydraulic accumulator 36 in the form of pressurized fluid. The auxiliary hydraulic pump 26 is driven by the internal combustion engine 14 in order to feed the auxiliary hydraulic system 24. At that point the variable displacement hydraulic motor 41 does not turn and therefore, the two fixed displacement hydraulic pumps 43 and 47 are not turning either.

Figure 14:
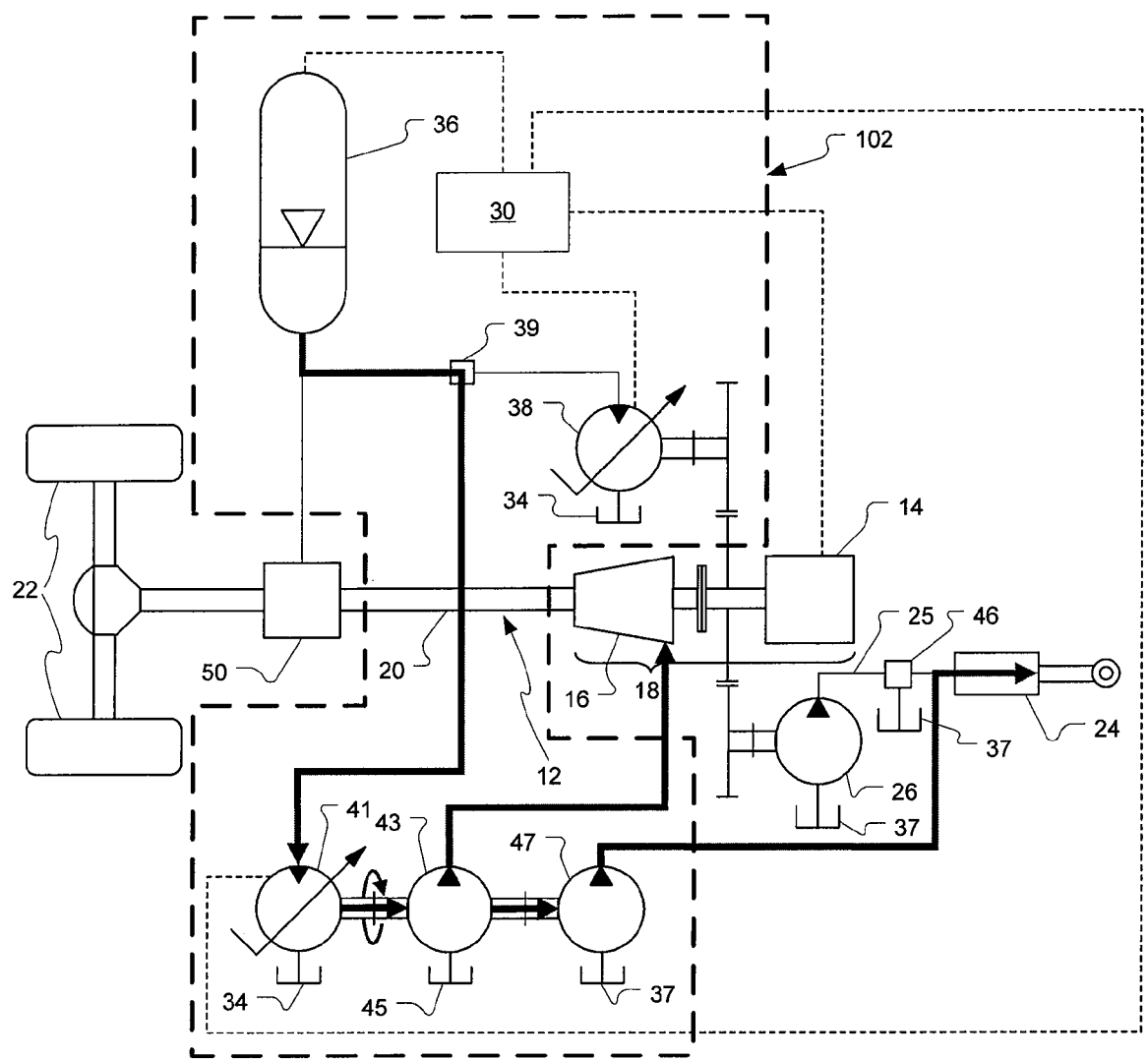
FIG. 14 is a schematic view of a fuel saving system in accordance with a third embodiment of the present subject matter representing the shutdown mode operation.

FIG. 14 schematically depicts the engine turned off mode of the fuel saving system 102. In this mode, when the vehicle is stopped, the internal combustion engine 14 is shut down if the controller 30 senses that there is enough energy stored in the hydraulic accumulator 36. When the internal combustion engine 14 is turned off, its rotational revolution goes from idling speed to zero. Because the auxiliary hydraulic pump 26 is mechanically connected to the internal combustion engine 14, the auxiliary hydraulic system 24 is no longer fed by auxiliary hydraulic pump 26 when the internal combustion engine 14 is turned off. Then simultaneously, the rotational speed of the variable displacement hydraulic motor 41 is inversely increased to drive the two fixed displacement hydraulic pumps 43 and 47. During the time where the internal combustion engine 14 is turned off, the variable displacement hydraulic motor 41, which is powered by the hydraulic accumulator 36, is modulated to maintain the required hydraulic power to the auxiliary hydraulic system 24. Also, to prevent the transmission 16 from falling out of a driving gear into a neutral gear, appropriate hydraulic pressure is constantly provided by the fixed displacement hydraulic pump 43 through a hydraulic circuit to the transmission 16 when the engine 14 is turned off. The fixed displacement hydraulic pump 43 is powered by the variable displacement motor 41 and provides only sufficient pressure to the transmission 16 to maintain it in a driving gear.

Figure 15:
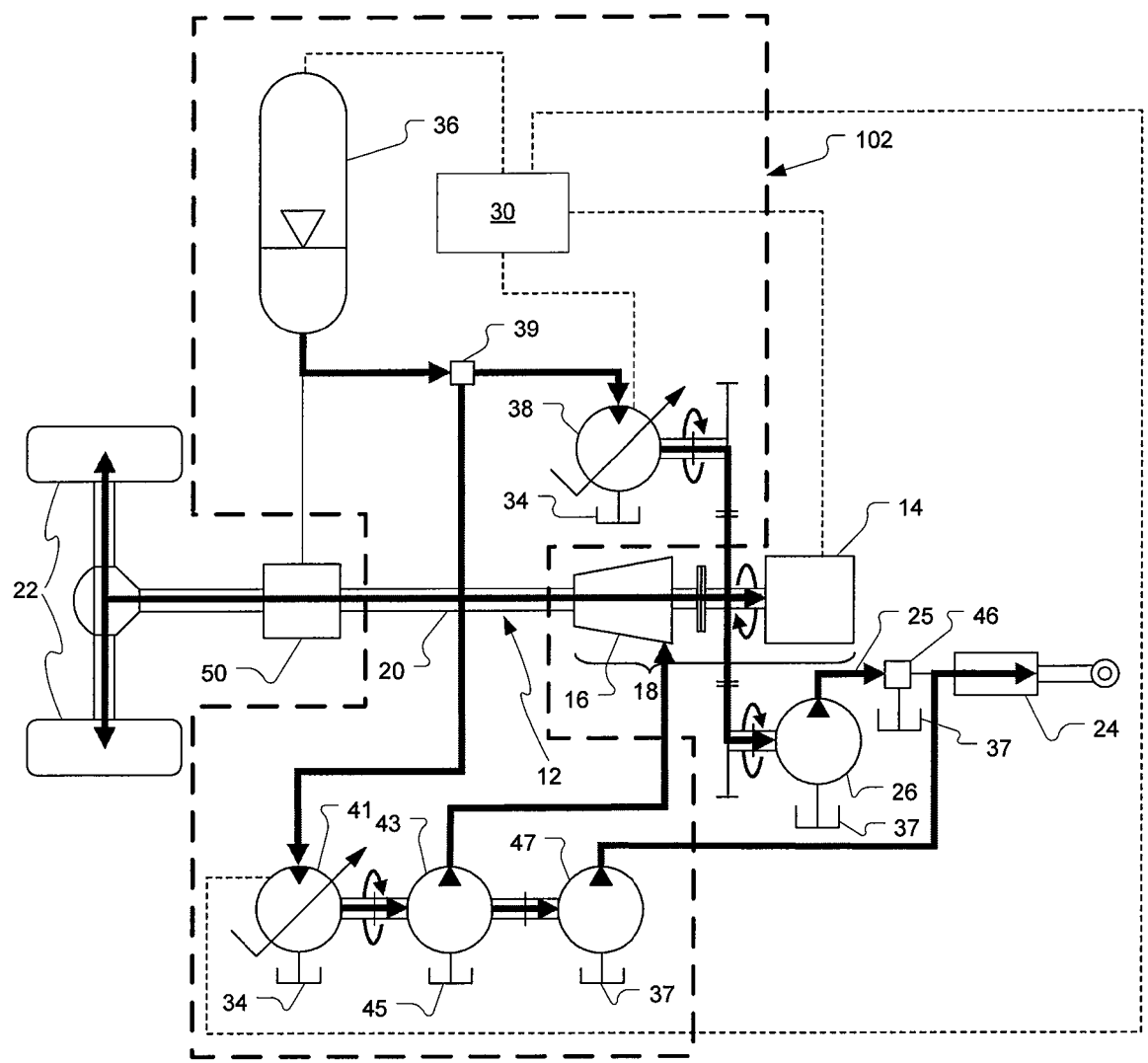
FIG. 15 is a schematic view of a fuel saving system in accordance with a third embodiment of the present subject matter representing the restarting mode operation.

FIG. 15 schematically depicts the engine restarting mode. In this mode, when the controller 30 detects that the driver of the vehicle releases the brake pedal and presses the accelerator pedal, or when the energy level in the hydraulic accumulator 36 is too low, the internal combustion engine 14 is restarted. The variable displacement hydraulic motor 38 is powered by the hydraulic accumulator 36 in order to provide a starting torque to the internal combustion engine 14. As the internal combustion engine 14 is being restarted, the auxiliary hydraulic pump 26 starts to supply hydraulic power to the auxiliary hydraulic system 24. Simultaneously, the rotational speed of the variable displacement hydraulic motor 41 is inversely reduced to zero. The internal combustion engine 14 is considered to be restarted when it has reached its idling speed. Once the internal combustion engine 14 is restarted, the variable displacement hydraulic motor 38 can continuously provide torque to the internal combustion engine 14 as long as there is some energy left in the hydraulic accumulator 36 in order to reduce the load on the internal combustion engine 14.

The controller 30 monitors the rotational speed of the motors 38 and 41 to determine the level of pressurized hydraulic fluid required to drive the auxiliary system 24. For example, an increased power demand from the auxiliary system 24 will cause a slowdown in the rotational speeds of motors 38 or 41 when either of these motors is driving the auxiliary system 24. The controller 30 responds to this slowdown by increasing the flow of pressurized hydraulic fluid to either motor. The controller 30 can also determine that the auxiliary system 24 has ceased demand for power by detecting an increase in the rotational speeds of either motors 38 or 41.

It will be appreciated by those skilled in the art that although the above alternative embodiments have been described in some detail many modifications may be practiced without departing from the claimed subject matter.

We claim:

1. A fuel saving system for a vehicle powered by an internal combustion engine and equipped with a hydraulically activated automatic transmission, the fuel saving system comprising:
   a transmission fluid pump able to supply pressurized transmission fluid to the automatic transmission;
   an energy storage device;
   at least one motor powered by the energy storage device, the at least one motor including a motor that is mechanically connected to the transmission fluid pump and a motor that is connected to the internal combustion engine through one of a PTO, a crankshaft and a flywheel and operable to selectively provide a starting torque to the internal combustion engine; and
   a controller responsive to one or more operating conditions to turn off the engine when the vehicle is stopped and to use the motor that is mechanically connected to the transmission fluid pump so as to activate the transmission fluid pump to supply sufficient power to the transmission to maintain engagement of the transmission in a driving gear,
   the controller also being responsive to one or more operating conditions to activate the motor that is connected to the engine so as to restart the engine with the transmission engaged in a driving gear.

2. The fuel saving system of claim 1, wherein the at least one motor comprises a first motor that is connected to the engine and a second motor that is mechanically connected to the transmission fluid pump.

3. The fuel saving system of claim 2, further comprising a first auxiliary hydraulic pump of an auxiliary hydraulic system, the first auxiliary hydraulic pump being connected to the engine.

4. The fuel saving system of claim 3, wherein the first auxiliary hydraulic pump is selectively driven by the internal combustion engine to supply pressurized hydraulic fluid to the auxiliary hydraulic system when the engine is running.

5. The fuel saving system of claim 3, wherein the second motor is further mechanically connected to a second auxiliary hydraulic pump for supplying pressurized hydraulic fluid to the auxiliary hydraulic system; and
   wherein the controller is responsive to one or more operating conditions to turn off the engine when the vehicle is stopped, and to use the motor that is mechanically connected to the transmission fluid pump to further activate the pump for the auxiliary hydraulic system to supply pressurized hydraulic fluid to the auxiliary hydraulic system.

6. The fuel saving system of claim 3, further comprising a third motor connected to a second auxiliary hydraulic pump for supplying pressurized hydraulic fluid to the auxiliary hydraulic system.

7. The fuel saving system of claim 3, further comprising an unloading valve for diverting hydraulic fluid from the first auxiliary hydraulic pump.

8. The fuel saving system of claim 1, wherein the energy storage device is an electric energy storage device and the at least one motor is an electric motor/generator powered by the electric energy storage device.

9. The fuel saving system of claim 1, wherein the energy storage device is a hydraulic accumulator and the at least one motor is a hydraulic motor powered by the hydraulic accumulator.

10. The fuel saving system of claim 2, wherein the energy storage device includes an electric energy storage device and the second motor that is mechanically connected to the transmission fluid pump is an electric motor/generator powered by the electric energy storage device; and
    wherein the energy storage device includes a hydraulic accumulator and the first motor that is connected to the engine is a hydraulic motor powered by the hydraulic accumulator.

11. The fuel saving system of claim 1, wherein the transmission fluid pump is external to the automatic transmission.

12. The fuel saving system of claim 1, wherein activating the motor that is coupled to the engine so as to restart the engine with the transmission engaged in a driving gear also sets the vehicle in motion.

13. The fuel saving system of claim 1, wherein the one or more operating conditions comprise an indication of speed of the vehicle, the controller responding to the indication to turn off the engine.

14. The fuel saving system of claim 1 wherein the operating conditions further comprises an amount of energy stored in the energy storage device, the controller evaluating whether to turn off the engine based on the amount of energy stored.

15. The fuel saving system of claim 1, wherein the operating conditions comprises a vehicle operator signal, the controller responding to the operator signal to restart the engine.

16. The fuel saving system of claim 1, wherein the energy storage device includes a rechargeable electrical energy storage device, and wherein the motor connected to the engine is an electric motor/generator operable to recharge the electrical energy storage device.

17. The fuel saving system of claim 9, wherein the hydraulic accumulator is charged by a braking energy recovery system.

18. The fuel saving system of claim 9, wherein the hydraulic accumulator is charged by the motor that is connected to the engine.

19. A fuel saving system for a vehicle powered by an internal combustion engine and equipped with a hydraulically activated automatic transmission, the fuel saving system comprising:
    a transmission fluid pump able to supply pressurized transmission fluid to the automatic transmission;
    an energy storage device having an electric energy storage device and a hydraulic accumulator;
    a first motor powered by the hydraulic accumulator and coupled to the engine and operable to selectively provide a starting torque to the internal combustion engine;
    a second electric motor/generator powered by the electric energy storage device and mechanically connected to the transmission fluid pump; and
    a controller responsive to one or more operating conditions to turn off the engine when the vehicle is stopped and to use the motor that is mechanically connected to the transmission fluid pump so as to activate the transmission fluid pump to supply sufficient power to the transmission to maintain engagement of the transmission in a driving gear,
    the controller also being responsive to one or more operating conditions to activate the motor that is coupled to the engine so as to restart the engine with the transmission engaged in a driving gear.

20. A fuel saving system for a vehicle powered by an internal combustion engine and equipped with a hydraulically activated automatic transmission, the fuel saving system comprising:
    a transmission fluid pump able to supply pressurized transmission fluid to the automatic transmission;
    an energy storage device having a rechargeable electrical energy storage device;

at least one motor powered by the energy storage device, the at least one motor including a motor that is mechanically connected to the transmission fluid pump and an electric motor/generator that is coupled to the engine and operable to selectively provide a starting torque to the internal combustion engine and to recharge the electrical energy storage device; and a controller responsive to one or more operating conditions to turn off the engine when the vehicle is stopped and to use the motor that is mechanically connected to the transmission fluid pump so as to activate the transmission fluid pump to supply sufficient power to the transmission to maintain engagement of the transmission in a driving gear, the controller also being responsive to one or more operating conditions to activate the motor that is coupled to the engine so as to restart the engine with the transmission engaged in a driving gear.

\* \* \* \* \*